United States Patent
Madej

(10) Patent No.: US 7,628,331 B2
(45) Date of Patent: Dec. 8, 2009

(54) METHOD AND SYSTEM FOR OPTIMIZING SCANNER PERFORMANCE

(75) Inventor: Dariusz Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 583 days.

(21) Appl. No.: 11/240,080

(22) Filed: Sep. 29, 2005

(65) Prior Publication Data

US 2007/0069027 A1 Mar. 29, 2007

(51) Int. Cl.
 *G02B 5/00* (2006.01)
(52) U.S. Cl. ............... 235/462.32; 235/462.33; 235/462.16; 235/462.22; 235/462.01; 235/462.09
(58) Field of Classification Search ............ 235/462.32, 235/462.33, 462.36, 462.37, 462.38, 462.39, 235/462.4, 462.41, 462.08, 462.09, 462.22, 235/462.23, 462.24, 462.25, 462.26
See application file for complete search history.

(56) References Cited

U.S. PATENT DOCUMENTS

| | | | | | |
|---|---|---|---|---|---|
| 4,782,220 | A | * | 11/1988 | Shuren | 235/462.18 |
| 5,115,121 | A | * | 5/1992 | Bianco et al. | 235/462.25 |
| 5,250,791 | A | * | 10/1993 | Heiman et al. | 235/462.21 |
| 5,386,107 | A | * | 1/1995 | Dvorkis et al. | 235/462.23 |
| 5,945,658 | A | * | 8/1999 | Salatto et al. | 235/462.22 |
| 7,212,682 | B2 | * | 5/2007 | Bian et al | 382/254 |
| 7,281,659 | B2 | * | 10/2007 | Page | 235/462.25 |
| 7,337,970 | B2 | * | 3/2008 | Joseph et al. | 235/462.24 |

* cited by examiner

*Primary Examiner*—Michael G Lee
*Assistant Examiner*—Kristy A Haupt

(57) ABSTRACT

Described is a method and system for optimizing scanner performance. The method comprises obtaining a digitized representation of a bar code, estimating a set of parameters from the digitized representation, adjusting a scan angle as a function of at least one parameter in the set of parameters.

29 Claims, 7 Drawing Sheets

35 degree scan angle 46 degree scan angle 53 degree scan angle

METHOD AND SYSTEM FOR OPTIMIZING SCANNER PERFORMANCE

BACKGROUND INFORMATION

Bar codes have become a part of everyday life. Most, if not all, consumer items have a bar code either on the item or attached to the item in some manner (e.g., a hang tag with a bar code). Organizations such as corporations and hospitals attach bar codes to physical property in order to keep track of the location of this physical property. Warehouses use bar codes on items, pallets, rows of racks, etc. to locate items and for inventory control. There are numerous other examples of bar codes being used for different purposes.

In each of these instances, it is not the act of attaching the bar code to the item that produces the favorable results, but the act of reading the bar code attached to the item and processing the information contained in the bar code, e.g., reading a bar code on a grocery item and charging the customer the correct amount for the grocery item. However, in many instances, the reading of the bar code is not an easy or straightforward task to accomplish. There may be instances where there is a problem with the bar code itself, e.g., the bar code image is not sufficiently sharp or has become damaged in some way, or instances where the reader causes a problem, e.g., the bar code reader is too close or far from the bar code to obtain a sharp image. If the bar code cannot be read, the myriad of benefits associated with bar coding items will not be realized.

SUMMARY OF THE INVENTION

The present invention relates to a method and system for optimizing scanner performance. The method comprises obtaining a digitized representation of a bar code, estimating a set of parameters from the digitized representation, adjusting a scan angle as a function of at least one parameter in the set of parameters.

DETAILED DESCRIPTION

Figure 1:
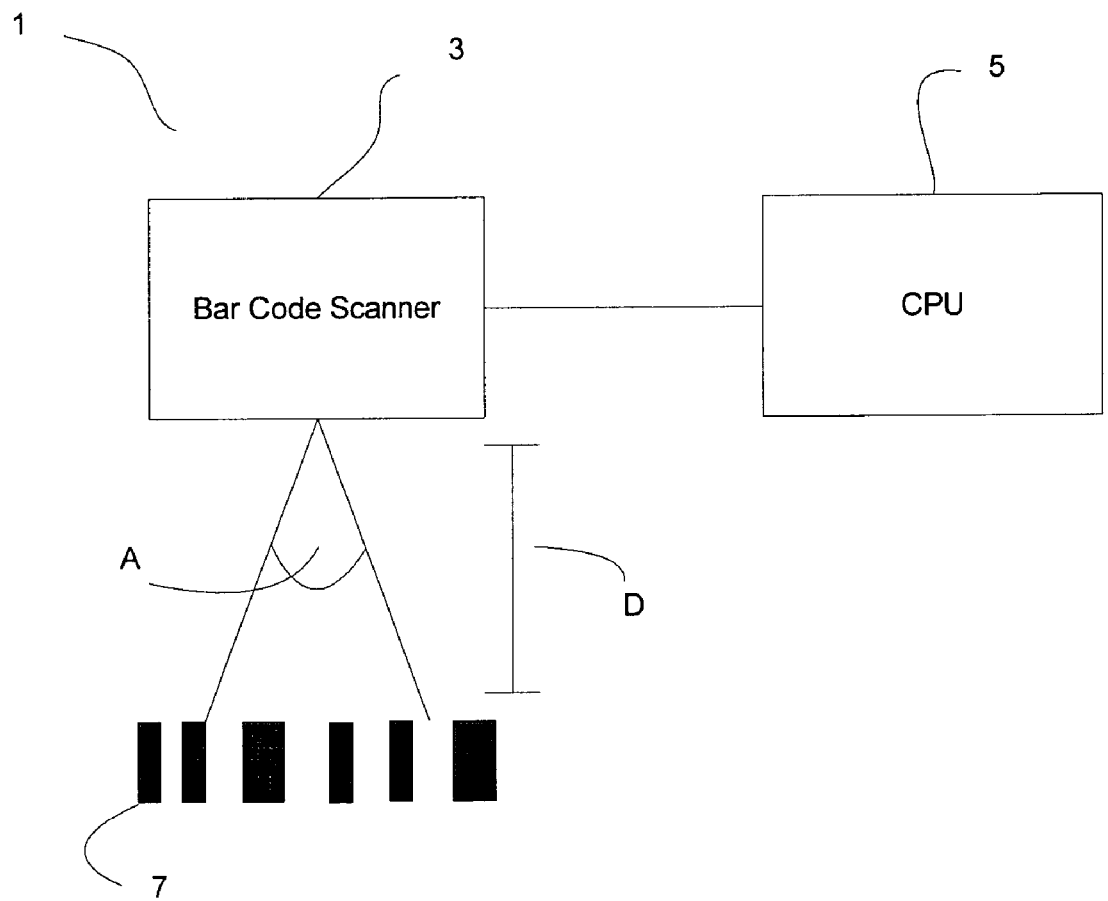
FIG. 1 shows an exemplary system for detecting and decoding a bar code.

The present invention may be further understood with reference to the following description and the appended drawings, wherein like elements are provided with the same reference numerals. The present invention discloses a system and method for optimizing scanner performance. The exemplary embodiments will be described with reference to a laser bar code scanner. However, those of skill in the art will understand that the present invention may also be utilized with other types of bar code scanning (e.g., imaging, etc.).

FIG. 1 shows an exemplary system 1 for detecting and decoding a bar code. A bar code scanner 3 collects data from a bar code 7. The bar code scanner 3 may be any type of bar code scanner, e.g., a laser bar code scanner, an imaging bar code scanner, etc. A laser bar code scanner collects data points using a reflection of a laser beam off of the bar code 7, while an imaging bar code scanner collects an image of the bar code 7. The scanner 3 collects the data from the bar code 7 (e.g., data points, image, etc) and may also perform some front end or pre-processing of the data. The scanner 3 then sends either the raw data or the pre-processed data (in the case where the scanner 3 includes front end processing capabilities) to a memory of a CPU 5. The CPU 5 includes a decoding engine which accesses the memory and completes the decoding of the bar code 7 by processing the data forwarded by the scanner 3 to extract the information contained in the bar code 7.

Figure 2:
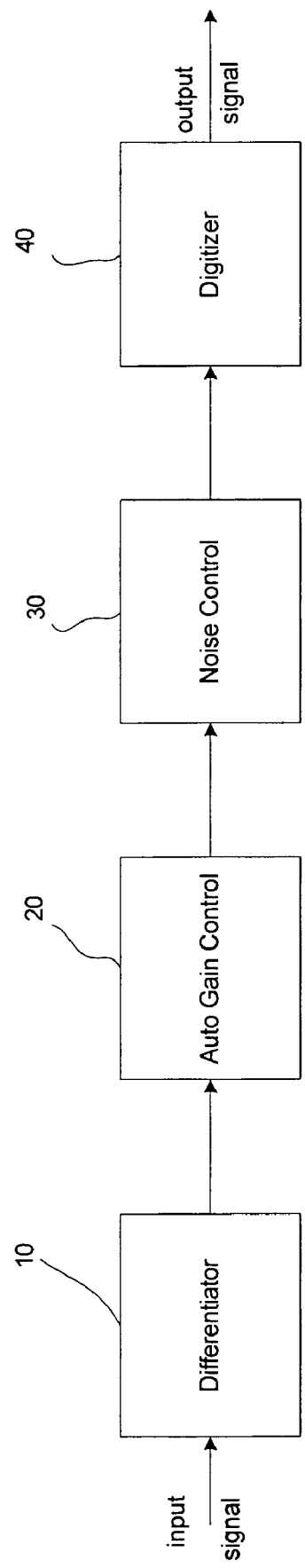
FIG. 2 shows a block diagram of exemplary front end processing components of a laser bar code scanner according to the present invention.
Figure 3:
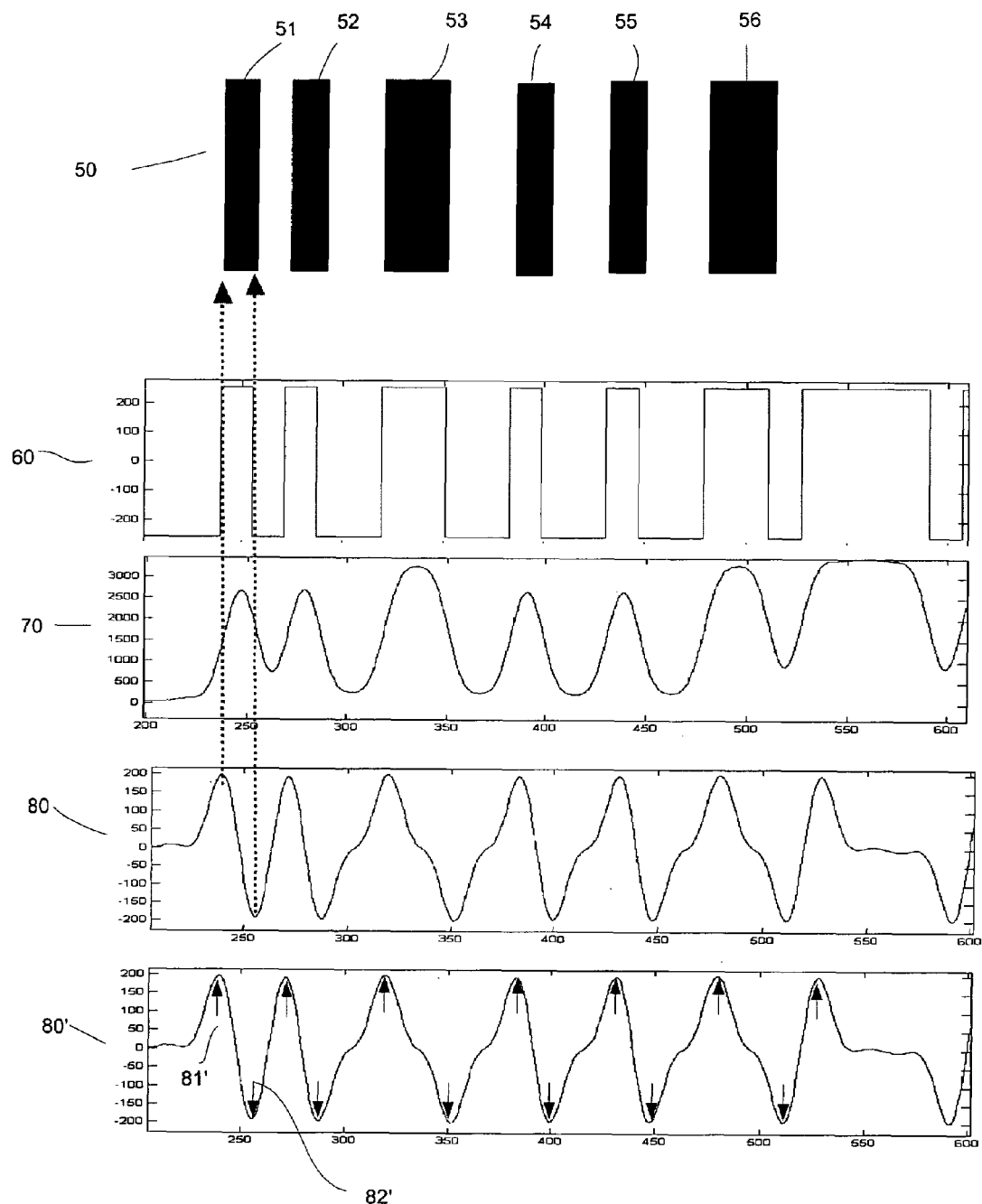
FIG. 3 shows an exemplary series of signals showing the laser bar code signal as it is processed according to the present invention.

FIG. 2 shows a block diagram of exemplary front end processing components 10-40 of the scanner 3. The front end processing components 10-40 of FIG. 2 will be described in conjunction with an exemplary series of signals shown in FIG. 3. Initially, FIG. 3 shows a bar code pattern 50 which will be scanned by the scanner 3. The bar code pattern 50 includes a series of bars 51-56. The scanner 3 scans the bar code 50. A typical laser bar code scanner generates several tens of thousands of data points per scan (e.g., 30,000 data points/scan) and makes multiple scans per second (e.g. 30 to 500 scans per second, with 100 scans being common for a hand held scanner).

The reflectance pattern 60 of FIG. 3 shows an inverted reflectance pattern of the bar code pattern 50 as scanned by the laser bar code scanner. This reflectance pattern 60 is convoluted with the laser beam of the scanner 3 to yield a laser signal 70 which is the input signal shown in FIG. 2.

Referring to FIG. 2, the input signal (e.g., the laser signal 70) is input into a differentiator 10 to yield a differentiated signal which is a first derivative of the input signal. An exemplary differentiated signal 80 output by the differentiator 10 is shown in FIG. 3. The differentiated signal 80' is a repeat of the exemplary differentiated signal 80, except that it uses arrows to show the various peaks and valleys of the differentiated signal 80'. These peaks and valleys correspond to the start and end of a bar. For example, the peak 81' corresponds to the start of the bar 51 and the valley 82' corresponds to the end of the bar 51.

Referring back to FIG. 2, the differentiated signal 80 is input into an auto gain control ("AGC") element 20 and a noise control element 30. Those of skill in the art will understand that these elements 20, 30 are signal conditioning elements which condition the signal for further processing. Those of skill in the art will also understand that the elements 20, 30 may contain a variety of components used for signal processing, e.g., noise control element 30 may include a series of low pass and high pass filters to filter out noise in various bandwidths.

The conditioned signal is then input into an analog digitizer 40 which is used to detect the edges (e.g., the peaks and valleys) of the signal. Then, by measuring a time elapsed between consecutive detected edges, the data, referred to as a Digital Bar Pattern ("DBP"), is created and is the output signal of the digitizer 40 shown in FIG. 2. The DBP may be the signal transmitted to the memory of a CPU (e.g., CPU 5 of FIG. 1) for further decoding. In an alternative embodiment, a digital device may also be used to generate a DBP equivalent. However, in either case, the DBP or DBP equivalent will show the edges of the bars in the bar code pattern. The DBP may also be generated using an analog-to-digital converter as described in U.S. application Ser. No. 11/137,871 entitled "Method and System for Decoding a Barcode" filed May 26, 2005, the entire disclosure of which is incorporated herein by reference.

However, as described above, for a variety of reasons the data collected by the scanner 3 may not be used to fully decode the scanned bar code. For example, the scanner 3 may be configured for a predetermined scan angle A selected from a predetermined range (e.g., approximately 30°-60°) as a function of a scanning application for which the scanner 3 is used. For example, the scanner 3 may be configured to utilize a Middle scan angle (e.g., approximately 46°) or a Wide scan angle (e.g., approximately 53°) when the scanner 3 scans bar codes at a close distance. A Narrow scan angle (e.g., approximately 35°) may be utilized when the scanner 3 scans bar codes at a farther distance, i.e., in industrial/warehouse scanning applications. As part of the configuration, the scanner 3 utilizes the scan angle A during its operation and only uses a different scan angle if re-configured. Generally, as the scan angle increases, a scan line (e.g., generated by reflecting the laser beam through the scan angle) increases in length, but becomes dimmer. The Wide scan angle may be utilized for wide bar codes and/or bar codes placed close to the scanner 3, but may be less useful for bar codes further away from the scanner 3 due to the dimness of the scan line. The Narrow scan angle, on the other hand, may be best utilized for scanning bar codes further from the scanner 3.

Figure 4A:
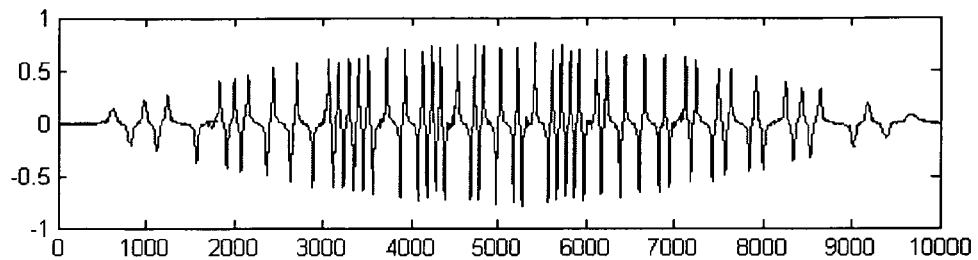
FIG. 4a shows an exemplary signal generated by the laser bar code scanner when the bar code is too close to the scanner.
Figure 4B:
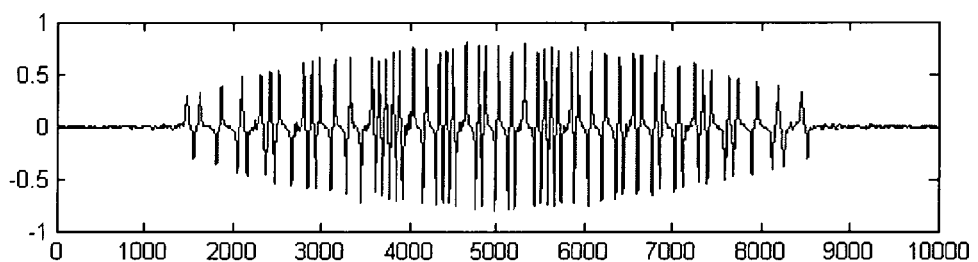
FIG. 4b shows an exemplary signal generated by the laser bar code scanner when the bar code is farther than in FIG. 4a, but still too close to the scanner.
Figure 4C:
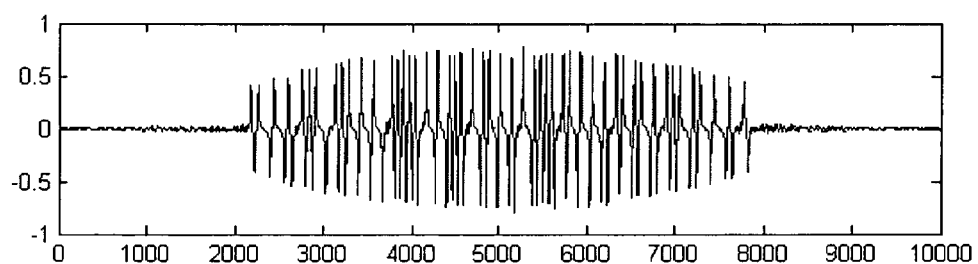
FIG. 4c shows an exemplary signal generated by the laser bar code scanner which is fully decodable.

As shown in FIG. 1, the bar code 7 may have been located at a distance D from the laser bar code scanner 3 during the scan, and the laser bar code scanner 3 may have been set to the predetermined scan angle A (e.g., the Narrow scan angle). Due to the proximity of the bar code 7 and the scan angle A, the scanner 3 may not obtain a decodable signal when scanning the bar code 7. For example, an exemplary signal generated during the scan when the scan angle A is the Narrow scan angle is shown in FIG. 4a. Between times 800 and 1800 and 8800 and 9800, there are distorted portions of the signal which render it undecodable. However, in this example, even had the Middle scan angle been used, the signal may still include distortion, as shown in FIG. 4b. A further increase in the scan angle to the Wide scan angle may eliminate the distortion, as shown in FIG. 4c, and provide a decodable signal. Those of skill in the art will understand that FIGS. 4a-4c show exemplary signals generated by the scanner 3 when the bar-code 7 has a predetermined size and is located at the distance D from the scanner 3. Thus, the signals are only exemplary and may change as a function of, for example, length/size of the bar code, distance from the scanner 3, scan angle, type of scanner, etc. Further, a similar problem may occur when the bar code 7 is too far from the laser bar code scanner 3 and/or the scan angle A is too wide.

The present invention provides a system and method for additional processing of a signal to adjust the scan angle based on the scanning conditions. In the exemplary embodiment, the scanner 3 may adjust the scan angle A as a function of the length/size of the bar code 7 and/or the distance D of the bar code 7 from the scanner 3. Those of skill in the art will understand that the present invention may be used with any type of scanner and CPU decoding engine. However, the exemplary embodiment of the present invention is particularly useful for scanners and CPUs which have limited random access memory ("RAM") and processing power, e.g., a scanner with 16-32 KB of RAM and CPU power of 10 MIPS (Million Instructions per Second).

Figure 5:
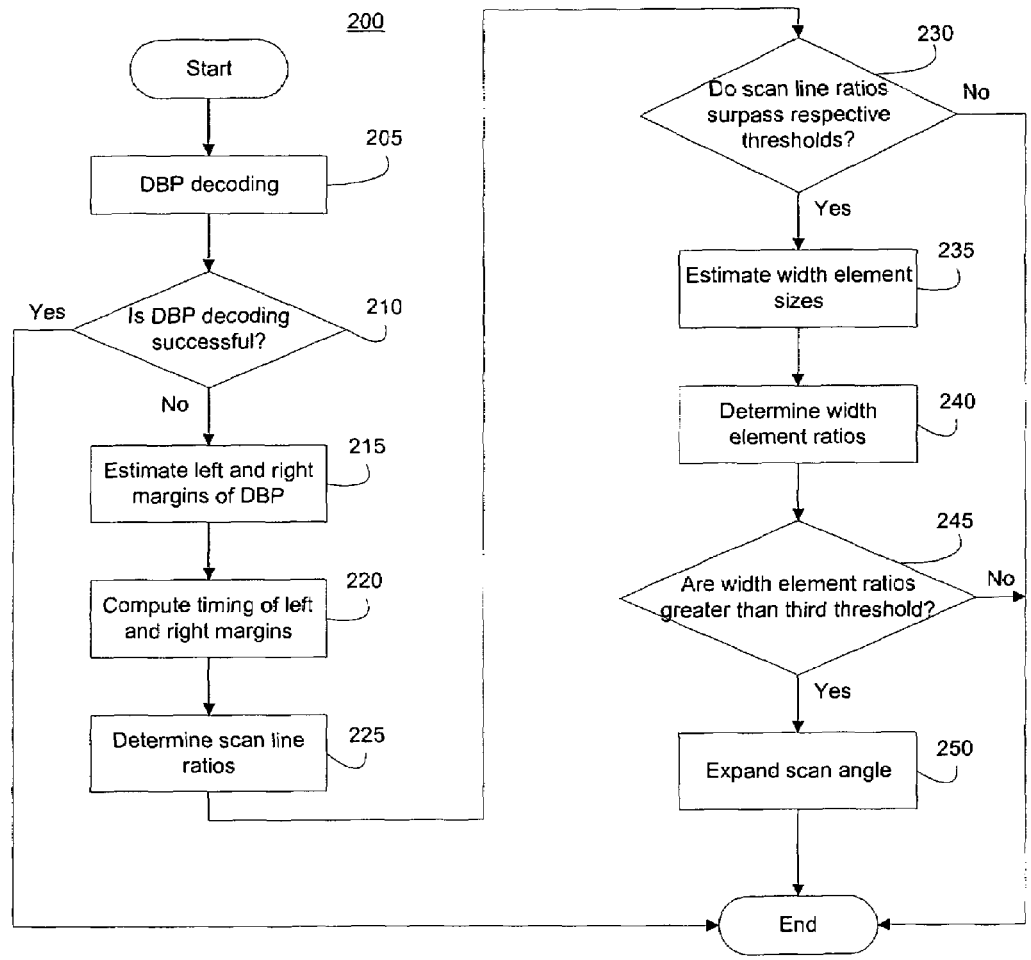
FIG. 5 shows an exemplary method for expanding a scan angle utilized by the scanner according to the present invention.

FIG. 5 shows an exemplary process 200 for adjusting a scan angle to account for the scanning conditions. In step 205, the bar code 7 is scanned and the DBP decoding is performed. The DBP decoding includes the collection of the bar code data, the pre-processing described above with reference to FIG. 2 to obtain the DBP and the CPU processing to complete the DBP decoding. The process then continues to step 210 to determine if the DBP decoding is successful. If the DBP decoding is successful, (i.e., the bar code can be fully decoded), then all the information contained in the bar code has been extracted and the process is complete. Thus, the portion of the process 200 related to scan angle adjustment may not yet be required.

However, if the DBP decoding is not successful, the process continues to perform the steps associated with the scan angle adjustment. The DBP data is used to estimate certain bar code parameters including boundaries of the bar code within the scan line for both the forward and backward scanning direction and an approximated width of one or more narrow elements of the bar code 7.

In step 215, the bar code start and end points are estimated. This estimation is based on margins of the bar code 7 located by the DBP decoding. A conventional center out margin search is performed resulting in a pair of DBP elements which are believed to be a first (Left margin) and a last (Right margin) DBP elements representing the bar code in a train of DBP elements. It should be noted that the estimation of the margins is valid when the signal-to-noise ratio is below a noise immunity of the digitizer 40, which depends on the digitizer thresholds used during edge detection. For digitizers using multiple thresholds, it is preferable to use the least sensitive threshold to provide for the best noise performance.

Figure 7:
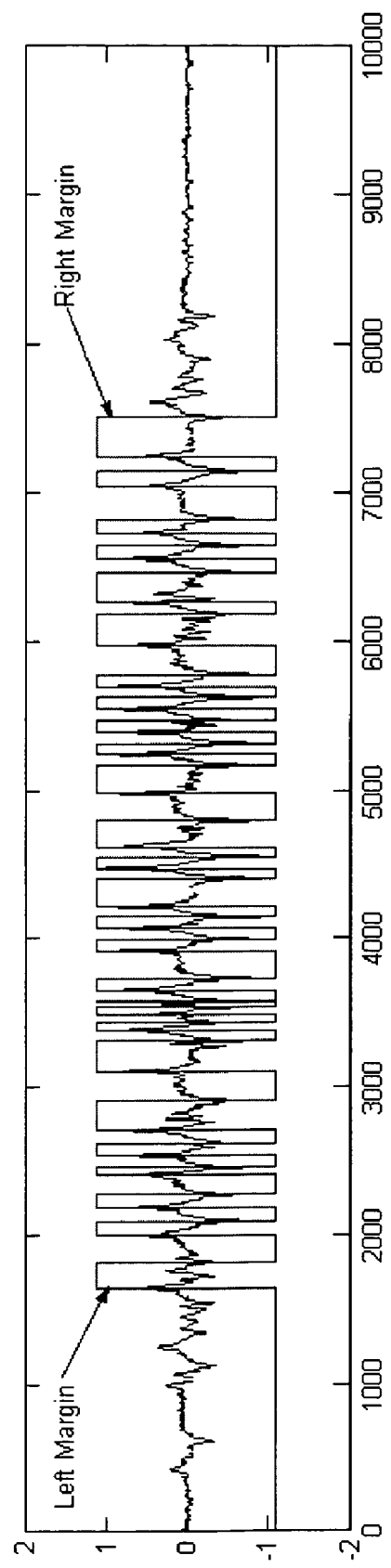
FIG. 7 shows an exemplary embodiment of a digitized bar pattern generated when the scan angle is too narrow.

The process then continues to step 220 where an absolute timing of the left margin ("AML") and an absolute timing of the right margin ("AMR") are computed. Those of skill in the art will understand that the AML and the AMR may be obtained from the DBP data. For example, as shown in FIG. 4a, a signal may be generated beginning at about 600 points and ending at about 9700 points. However, the amplitude of the signals around these points may be too low to be recognized as edges by the digitizer 40. Thus, the AML may be at about 1200 points and the AMR may be at about 8500 points, where the amplitude of the signal is sufficient to be recognized by the digitizer 40 as edges of the bar code. However, when the digitizer 40 generates the DBP of the signal shown in FIG. 4a, the Left and Right margins may cut off portions of the signal representing the true edges of the bar code 7, i.e., from 600 points-1200 points and 8500 points-9700 points. An exemplary DBP showing the Left and Right margins cutting off portions of the signal is shown in FIG. 7.

A length of a scan line ("SL") is about 10,000 points as shown on the horizontal axis of the signal graph. The length of the scan line may be calculated based on the scan angle A and a predetermined sampling rate utilized by the scanner 3 (e.g., 10,000 data points per scan).

In step 225, a pair of scan line ratios are determined. A first ratio is determined by dividing the AML by the length of the scan line, and a second ratio is determined by dividing the AMR by the length of the scan line. As shown in FIGS. 4a-4c, the length of the scan line is about 10,000. Thus, the first ratio AML/SL equals 0.12 (1200/10,000), and the second ratio AMR/SL equals 0.85 (8500/10,000). The scan line ratios are indicative of how close to the edge of the scan line that the scanner 3 started/ended receiving a signal from the bar code 7. Ideally, it is desired that the bar code detection is performed within the center portion of the scan line so that a portion of the bar code 7 is not missed or distorted because of edge effects at the margins of the scan line.

Thus, in step 230, the first and second ratios are compared to first and second threshold values, respectively. The threshold values may be configured based on the type of scanner. The threshold values may be set based on a number of factors including both actual and theoretical scanning results for the type of scanner on which the present invention is being implemented. For example, a combination of actual operating experience and theoretical calculations for a scanner may indicate that if the margins of the signal are within 15% of the edge of the scanning field, there exists the possibility that the captured signal may not be complete or may be distorted in some manner. Whereas, if the margins are inside the 15% value, it is probable that the captured signal is sufficient.

Therefore, using the exemplary values of 15% for the exemplary embodiment, the first threshold value may be 0.15 and the second threshold value may be 0.85. When the first ratio (AML/SL) is greater than the first threshold and the second ratio (AMR/SL) is less than the second threshold, the scan angle A may be maintained at a current setting. That is, because the margins of the captured signal are within the defined threshold of the scan line, a substantial portion of the bar code 7 has been captured during the scan, so that a decodable signal is generated. Thus, the process 200 may be finished because there is no need to adjust the scan angle A. Those of skill in the art will understand that the 15% value is only exemplary and that the threshold values may be adjusted according to actual or theoretical operation of an individual scanner.

However, when the first ratio is less than the first threshold and/or the second ratio is greater than the second threshold, the process continues to step 235 where a width of a narrow element at a center ("AWC") between the Left and Right margins is estimated. As described above, there may be edge distortion near the margins of the collected signal due to a lower speed of the laser beam at the edges of the scan line as compared to the middle of the scan line. However, the portion of the collected signal which is centered between the margins should be an accurate representation of the bar code 7. Thus, the width of narrow elements in this center portion should be accurately measured and determined. The exemplary method according to the present invention may collect measurements of multiple narrow width elements in the center portion and average these measurements to result in the AWC value.

Also, in step 235, a maximum narrow width element is measured around each of the Left and Right margins ("AWL" and "AWR", respectively). That is, the width value for the maximum narrow width element in the area of each of the left and right margins is determined. The above-described measurements for AWL and AWR are preferably done separately for spaces and bars to compensate for bar-width growth.

In step 240, a pair of width element ratios are determined. A first width element ratio is computed by dividing the AWL by the AWC, and a second width element ratio is computed by dividing the AWR by the AWC. These width element ratios are indicative of how large the maximum narrow width elements at the margins are versus the average narrow width element at the center of the scan line (e.g., the center between the margins).

In step 245, the process continues to determine whether at least one of the width element ratios is greater than a third threshold value. The maximum narrow width elements at the margins should be the same size as the average narrow width element at the center, within a certain tolerance level. Thus, the threshold value will be set to be outside this tolerance level, i.e., one or both of the margin maximum narrow width elements are greater than the center average narrow width element*tolerance factor. In this example, the tolerance factor may be 50% resulting in a third threshold value of 1.5, i.e., if either the AWL or the AWR are greater than AWC*1.5, the condition of step 245 is satisfied. Similar to the margin thresholds, the third threshold may be varied depending on the scanner used. If neither width element ratio is greater than the third threshold, the scan angle A may be maintained at the current setting.

However, when at least one of the width element ratios is greater than the third threshold, the process continues to step 250 where the scan angle A is expanded. The scanner 3 provides visual confirmation of the expanded scan angle because the scan line lengthens. In one embodiment, the scan angle A may be expanded from its current setting through a predetermined range of angles or in predetermined increments until the process indicates that the DBP can be decoded. For example, if the scan angle A was initially set at the Narrow scan angle (e.g., 35°) and yielded the signal shown in FIG. 4a, at the end of the method 200 in step 250, the scan angle may be expanded to the Middle scan angle (e.g., 46°). However, the signal generated when using the Middle scan angle produces the signal shown in FIG. 4b. Thus, at the end of the method 200, in the second iteration, the scan angle A may be expanded to the Wide scan angle. Thus, in the exemplary embodiment, only when the scan angle A is set to the Wide scan angle does the scanner 3 generate a decodable signal.

The process for adjusting the scan angle A described herein may be understood with the following pseudocode:

If
[(AML/SL<threshold_1) or (AMR/SL>threshold_2)]
AND
[(AWL/AWC>threshold_3) or (AWR/SL>threshold_3)]
then
expand the scan angle.

Those of skill in the art will understand that the decision logic shown above is merely an exemplary embodiment of a process to determine whether the scan angle A should be adjusted.

In another embodiment, a variance of the AWC may be computed and used in order to rule out the case when the digitizer 40 may be overwhelmed by noise, such as when the signal shows the DBP elements spread along the entire length of the scan line. When the variance is low, it may be determined that the bar code 7 is too close to the scanner 3, and the scan angle A may be expanded. When the noise level exceeds a digitizer noise threshold, the digitizer 40 may be overwhelmed by noise and yield false transitions. As such, the AML and AMR may not be correct which would lead to an erroneous decision to expand the scan angle A. Measuring the variance of the narrow width element across the scan line may distinguish a case of the high noise level from a case of the bar code 7 being too close to the scanner 3. If the variance is high, it may indicate the high noise level. When the variance is low, it may indicate that the bar code 7 is too close to the scanner 3 and that the scan angle 3 should be expanded.

Although, the method 200 is described with reference to expanding the scan angle A due to a location and/or size of the bar code 7, those of skill in the art will understand that the present invention may further be utilized to narrow the scan angle A when, for example, the bar code 7 is smaller and/or at an increased distance from the scanner 3. Decreasing the scan angle A may require a longer time than increasing the scan angle A due to inertia of a scan mirror utilized by the scanner 3. However, in one embodiment, the scanner 3 includes a brake circuit engaging the scan mirror or a scan motor (i.e., components controlling movement of the scan mirror) to slow movement of the scan mirror. The brake circuit may completely stop the mirror and then initiate scanning at the decreased scan angle. Alternatively, the brake circuit dynamically applies stops to the scan mirror or the scan motor limiting angular motion of the scan mirror until a desired scan angle is achieved.

Figure 6:
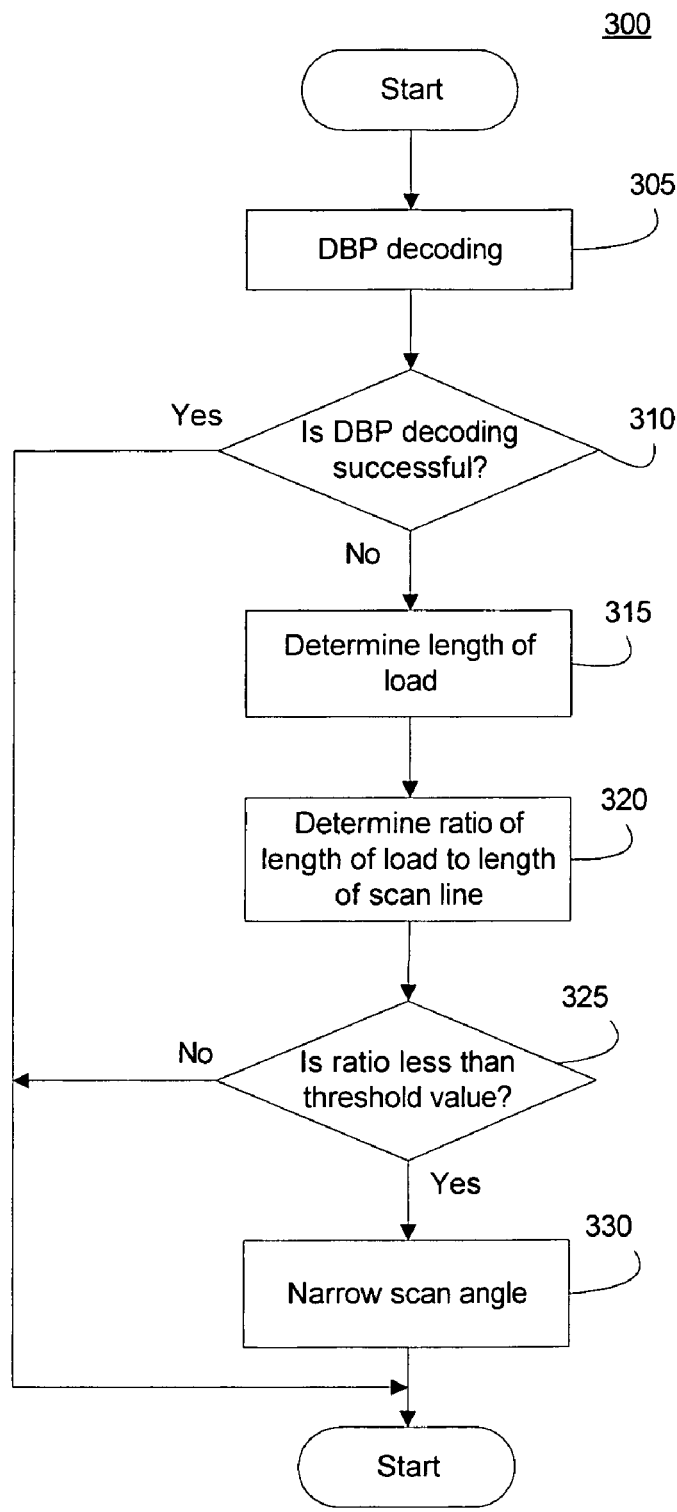
FIG. 6 shows an exemplary method for narrowing a scan angle utilized by the scanner according to the present invention.

FIG. 6 shows an exemplary embodiment of a method 300 for narrowing the scan angle A. In step 305, the bar code 7 is scanned and the DBP decoding is performed. The DBP decoding includes the collection of the bar code data, the preprocessing described above with reference to FIG. 2 to obtain the DBP and the CPU processing to complete the DBP decoding. The process then continues to step 310 to determine if the DBP decoding is successful. If the DBP decoding is successful, (i.e., the bar code can be fully decoded), then all the information contained in the bar code has been extracted and the process is complete. Thus, the portion of the process 300 related to scan angle adjustment may not yet be required.

However, if the DBP decoding is not successful, the process continues to perform the steps associated with the scan angle adjustment. In step 315, a length of a load on the scan line is determined, i.e., the signal between the left and right margins. For example, as shown in FIG. 4c, the load would be approximately 6000 (from the left margin 2000 to the right margin 8000). In step 320, a ratio of the length of the load to the length of the scan line is determined. In the present example, the ratio would be approximately 0.60 (6000/10,000). Thus, the length of the load is approximately 60% of the length of the scan line.

In step 325, the process continues to determine whether the ratio is less than a threshold value (e.g., 30%). Thus, if the signal generated by the bar code 7 is less than approximately ⅓ of the scan line, it may be determined that the scan angle A is too wide. When the ratio is less than the threshold value, the process proceeds to step 330 where the scan angle A is narrowed. As stated above, visual confirmation of the decreased scan angle is provided by the shortened and brighter scan line. Also, a frequency of the bar code may be decreased by about 25%. That is, as the scan line shortens, the laser beam moves slower and has more time to cover the scan line. Thus, the frequency of the bar code decreases.

Those of skill in the art will understand that after the scan angle A is adjusted, corresponding adjustments may be made to settings of the AGC 20, the noise control 30 and/or the digitizer 40. For example, the corresponding adjustments may improve the decoding of the signal.

The present invention has been described with the reference to the above exemplary embodiments. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method, comprising:
    obtaining a digitized representation of a bar code by detecting a characteristic of the bar code;
    estimating a set of parameters from the digitized representation;
    computing at least one of a scan line ratio, a load ratio, and a width element ratio based on at least one of the set of parameters; and
    adjusting a scan angle as a function of at least one of the scan line ratio, the load ratio, and the width element ratio.

2. The method according to claim 1, wherein the set of parameters includes left and right margins of the bar code.

3. The method according to claim 2, further comprising: determining timings of the left and right margins along a scan line.

4. The method according to claim 2, further comprising: measuring a length of a load between the left and right margins.

5. The method according to claim 1, further comprising: adjusting at least one of a automatic gain control, a noise filter and a digitizer as a function of the adjustment to the scan angle.

6. The method according to claim 1, wherein the at least one parameter includes a variance of an element width.

7. A method comprising:
    obtaining a digitized representation of a bar code;
    estimating a set of parameters from the digitized representation;
    adjusting a scan angle as a function of at least one parameter in the set of parameters, wherein the set of parameters includes left and right margins of the bar code;
    determining timings of the left and right margins along a scan line; and
    computing first and second scan line ratios, the first scan line ratio being the timing of the left margin divided by a length of the scan line, the second scan line ratio being the timing of the right margin divided by the length of the scan line.

8. The method according to claim 7, further comprising: comparing the first and second scan line ratios to first and second threshold values, respectively, the first threshold value corresponding to a first predetermined point on the scan line, the second threshold value corresponding to a second predetermined point on the scan line.

9. The method according to claim 8, further comprising: when at least one of (i) the first scan line ratio is less than the first threshold value and (ii) the second scan line ratio is greater than the second threshold value, determining widths of an element at a center of the scan line and elements at the left and right margins.

10. The method according to claim 9, further comprising: applying a tolerance level to the width of the element at the center to generate a third threshold value; and when at least one of the widths of the elements at the left and right margins are greater than the third threshold value, expanding the scan angle.

11. A method comprising:
    obtaining a digitized representation of a bar code;
    estimating a set of parameters from the digitized representation;
    adjusting a scan angle as a function of at least one parameter in the set of parameters, wherein the set of parameters includes left and right margins of the bar code;
    measuring a length of a load between the left and right margins;
    generating a load ratio by dividing the length of the load by a length of a scan line; and
    narrowing the scan angle when the load ratio is less than a fourth threshold value.

12. The method according to claim 11, wherein the fourth threshold value is a predetermined percentage of the length of the scan line.

13. A method comprising:
obtaining a digitized representation of a bar code;
estimating a set of parameters from the digitized representation;
adjusting a scan angle as a function of at least one parameter in the set of parameters, wherein the at least one parameter includes a variance of an element width;
maintaining the scan angle at a current setting when the variance is greater than a predetermined threshold; and
increasing the scan angle when the variance is lower than the predetermined threshold.

14. A system, comprising:
a bar code scanner acquiring information from a bar code by detecting a characteristic of the bar code and outputting a digitized representation of the bar code; and
a processor receiving the digitized representation and estimating a set of parameters from the digitized representation, the processor computing at least one of a scan line ratio, a load ratio, and a width element ratio based on at least one of the set of parameters, wherein the processor directs the bar code scanner to adjust a scan angle as a function of at least one of the scan line ratio, the load ratio, and the width element ratio.

15. The system according to claim 14, wherein the set of parameters includes left and right margins of the bar code.

16. The system according to claim 15, wherein the processor determines timings of the left and right margins along a scan line.

17. The system according to claim 15, wherein the processor measures a length of a load between the left and right margins.

18. A system, comprising:
a bar code scanner acquiring information from a bar code and outputting a digitized representation of the bar code; and
a processor receiving the digitized representation and estimating a set of parameters from the digitized representation, wherein the processor directs the bar code scanner to adjust a scan angle as a function of at least one parameter in the set of parameters, wherein the set of parameters includes left and right margins of the bar code, wherein the processor determines timings of the left and right margins along a scan line and determines first and second scan line ratios, the first scan line ratio being the timing of the left margin divided by a length of the scan line, the second scan line ratio being the timing of the right margin divided by the length of the scan line.

19. The system according to claim 18, wherein the processor compares the first and second scan line ratios to first and second threshold values, respectively, the first threshold value being a predetermined portion of a beginning of the scan line, the second threshold value being a predetermined portion of an end of the scan line.

20. The system according to claim 19, wherein when at least one of (i) the first scan line ratio is less than the first threshold value and (ii) the second scan line ratio is greater than the second threshold value, the processor determines widths of an element at a center of the scan line and elements at the left and right margins.

21. The system according to claim 20, wherein the processor utilizes a tolerance level and the width of the element at the center to generate a third threshold value, and when at least one of the widths of the elements at the left and right margins are greater than the third threshold value, the processor controlling the scanner to increase the scan angle.

22. A system, comprising:
a bar code scanner acquiring information from a bar code and outputting a digitized representation of the bar code; and
a processor receiving the digitized representation and estimating a set of parameters from the digitized representation, wherein the processor directs the bar code scanner to adjust a scan angle as a function of at least one parameter in the set of parameters, wherein the set of parameters includes left and right margins of the bar code, wherein the processor determines timings of the left and right margins along a scan line, and generates a load ratio by dividing the length of the load by a length of a scan line, and when the load ratio is less than a fourth threshold value, the processor controlling the scanner to decrease the scan angle.

23. The system according to claim 22, wherein the fourth threshold value is a predetermined percentage of the length of the scan line.

24. A bar code scanner, comprising: a scanning engine collecting data from a bar code by detecting a characteristic of the bar code; a digitizer generating a digitized representation of the bar code; and a processor estimating a set of parameters from the digitized representation, computing at least one of a scan line ratio, a load ratio, and a width element ratio based on at least one of the set of parameters, and adjusting a scan angle as a function of at least one of the scan line ratio, the load ratio, and the width element ratio.

25. The bar code scanner of claim 24, wherein the bar code scanner is one of a laser bar code scanner and an imaging bar code scanner.

26. The bar code scanner of claim 24, further comprising: a differentiator generating a differentiated signal from the collected data, wherein the output of the differentiator is sent to the digitizer.

27. The bar code scanner of claim 24, further comprising: a signal conditioning element conditioning the differentiated signal, the signal conditioning element including at least one of an auto gain control element and a noise control element.

28. The bar code scanner of claim 24, wherein the at least one parameter includes left and right margins of the bar code and widths of elements at the left and right margins and at a center of the bar code.

29. The bar code scanner of claim 24, further comprising: a scan mirror reflecting a laser beam to generate a scan line; and a brake circuit decreasing an angular motion of the mirror shortening the scan line.

* * * * *